United States Patent [19]

Aoshima

[11] Patent Number: 5,353,078
[45] Date of Patent: Oct. 4, 1994

[54] CAMERA HAVING A MAGNETIC RECORDING DEVICE

[75] Inventor: Chikara Aoshima, Zama, Japan

[73] Assignee: Canon Kabushiki Kaisha, Tokyo, Japan

[21] Appl. No.: 183,244

[22] Filed: Jan. 19, 1994

Related U.S. Application Data

[63] Continuation of Ser. No. 786,850, Nov. 1, 1991, abandoned.

[30] Foreign Application Priority Data

Nov. 7, 1990 [JP] Japan .................. 2-299819
Nov. 14, 1990 [JP] Japan .................. 2-306003

[51] Int. Cl.5 ............................. G03B 17/24
[52] U.S. Cl. ........................... 354/105; 354/106
[58] Field of Search ..................... 354/105, 106

[56] References Cited

U.S. PATENT DOCUMENTS

| | | | |
|---|---|---|---|
| 4,642,717 | 2/1987 | Matsuda et al. | 360/105 |
| 4,834,306 | 5/1989 | Robertson et al. | 242/71.1 |
| 4,864,332 | 9/1989 | Harvey | 354/21 |
| 4,947,196 | 8/1990 | Wash et al. | 354/76 |
| 5,016,030 | 5/1991 | Dwyer et al. | 354/21 |
| 5,023,635 | 6/1991 | Nealon | 354/76 |
| 5,028,940 | 7/1991 | Pearson | 354/75 |
| 5,136,318 | 8/1992 | Aoshima | 354/105 |

FOREIGN PATENT DOCUMENTS

| | | |
|---|---|---|
| 0433019 | 6/1991 | European Pat. Off. . |
| 0435277 | 7/1991 | European Pat. Off. . |
| 9004203 | 4/1990 | PCT Int'l Appl. . |

Primary Examiner—Michael L. Gellner
Assistant Examiner—Nicholas J. Tuccillo
Attorney, Agent, or Firm—Fitzpatrick, Cella, Harper & Scinto

[57] ABSTRACT

In a camera which includes a magnetic head which writes into and/or reads from a magnetic storage portion provided on a film while the film is conveyed. A magnetic head is positioned to stay away from a film when the film is conveyed without being exposed, such as during pre-winding, and is positioned to contact the film when the film is conveyed one frame after an exposure. Such positioning operation is drivingly connected to film-conveying operation by a simple mechanism.

15 Claims, 19 Drawing Sheets

CAMERA HAVING A MAGNETIC RECORDING DEVICE

This application is a continuation of application Ser. No. 07/786,850 filed Nov. 1, 1991, now abandoned.

BACKGROUND OF THE INVENTION

1. Field of the Invention

The present invention relates to improvements in a pre-wind type camera which employs a film having a magnetic storage portion and which comprises: a magnetic head for writing to and/or reading from the magnetic storage portion provided on the film; a pressing element for pressing the magnetic head and the storage portion to touch each other; and a motor for conveying the film.

The above mentioned pre-wind type camera refers to a camera which winds the entire film on a film-winding spool and then rewinds the film one frame at a time.

2. Description of the Related Art

In a conventional film-loading method, a film is loaded by engaging a tip portion, i.e. the leader, of the film protruding from the film cartridge with a sprocket or winding spool and then by rotating the sprocket or the winding spool. In such a method, a user has to take the trouble of setting the leader of the film in a designated position. If the leader is not set in the proper position, the film may not be loaded properly. Further, when setting the leader, the user may draw out and expose the film more than is necessary.

To solve this problem, U.S. Pat. No. 4,834,306 discloses a new type film cartridge which is described below and is illustrated in FIGS. 10 to 12.

As shown in the FIGS. 10 to 12, a slit 37 is provided to guide the film out of the cartridge. The film 34 is coiled around a film spool 38 with one of its ends fixed to a recess 38a provided on the film spool 38. Stopper elements 39 having restricting portions 39a are provided concentrically with the film spool 38. The restricting portions 39a keep the outermost layer of the film 34 from radially expanding and touching the inside wall 35a of the film cartridge 35. Releasing elements 40 are provided for deforming portions of the stopper elements 39 to continuously release the outermost layer of the film from radial restriction by the stopper elements 39. The released portion of the film 34 is guided to the slit 37 by guiding elements 41. In this construction, the film 34 can be pushed out of the cartridge 35 by rotating the film spool 38 in the uncoiling direction, since the outermost layer of the film 34 tends to expand by the uncoiling rotation of the spool 38 and presses the stopper elements 39 firmly enough to prohibit sliding between the stopper elements 39 and the outermost layer of the film 34.

In using this kind of cartridge (referred to as a "thrust-type film cartridge"), the user does not have to touch the leader of the film 34 when loading the film 34 in the camera. After the film cartridge 35 is set in the camera, the film 34 is forced out of the film cartridge by the rotation of the film spool 38 transmitted from a fork of the camera until the tip portion of the film 34 hooks or curls around the film spool in the camera. Then the film spool 38 of the camera winds and draws the film 34 to complete the film loading operation.

U.S. Pat. No. 4,864,332 discloses a camera wherein a magnetic head writes photographic data, such as shutter speed, aperture, date and title into a magnetic storage portion provided in the film and reads out the data upon request.

Also, Wo90/04203 (PCT/US89/04343) discloses a camera wherein a magnetic head writes into a magnetic storage portion of the film only when one frame has been exposed and the film is being advanced to the next frame.

For accurate writing and/or reading in such a camera, the magnetic head and the storage portion of the film must be pressed to securely touch each other when the head writes to and/or reads from the storage portion. Accordingly, a film-pressing means such as a pressing pad must be provided on the other side of the film from the magnetic head. When the thrust-type film cartridge is employed to accommodate a film having a magnetic storage portion, there exist the following problems:

1) In a construction where the film-pressing means is always pressed to the head by an elastic element such as a spring:
   when the film is being pushed out for loading, the tip of the film may be stopped at the film-pressing means or the magnetic head. In such a case, loading the film is no longer possible.
2) In a construction where the film-pressing means or the magnetic head is designed to be moved by a motor or the like in the direction of the thickness of the film so that the film-pressing means or the magnetic head stays away from the path of the film until the tip of the film has passed thereby:
   installing another drive source such as a motor raises costs. Also, a complicated electric circuit is required due to the complicated timing involved in pressing the film onto the head.

The magnetic storage portion of the film extends in the lengthwise direction thereof at a predetermined position. To respond to increasing information to be written and/or read, the magnetic head must be precisely positioned at the predetermined position.

The inventor has made an application for a camera comprising a film platen which has a magnetic head fixed thereto and a guide portion and which is movable substantially perpendicular to the film surface and is rotatable on a plane parallel with the film surface, and wherein the film platen is pressed by an elastic element such as a spring so that the guide portion pressingly touches a film edge and thus a magnetic storage portion of the film is precisely positioned with respect to the magnetic head.

When the thrust-type film cartridge accommodating a film having a magnetic storage portion is set in such a camera as constructed above and the film is pushed out for automatic loading, the film tip pushes the guide portion against the restoration force of the elastic element and then the guiding portion abuts against an edge surface of the film. However, there is a possibility that the film may be bent or caught at the guide portion when film is pushed against the force of the elastic element. In such a case, the film can no longer be pushed out.

SUMMARY OF THE INVENTION

One object of the present invention is to provide a camera which controls the magnetic head to stay away from the magnetic storage portion of a film while the film is conveyed without any of the frames being exposed and to contact the magnetic storage portion when a frame is ready for exposure in the picture-taking mode of the camera.

Another object of the invention is to provide a camera which controls the contact or non-contact position of the head according to the movements of the mechanism involved in the picture-taking sequential operations.

Another object of the invention is to provide a camera which controls the head position according to the film-conveying operations.

Still another object of the invention is to provide a camera which shifts the head position by a film-conveying motor.

A further object of the invention is to provide a pre-wind type camera which places the magnetic head at the non-contact position during pre-winding and at the contact position when the pre-winding is completed.

A still further object of the invention is to provide a camera comprising a guide portion which contacts the film in order to place the head to a predetermined position on the film and a controlling means which shifts the guide portion to avoid contact with the film when necessary.

Further, another object of the invention is to provide a camera comprising a control means which keeps the guide portion at the non-contact position until a predetermined number of frames from the leader have been wound and, after that, shifts the guide portion to the contact position.

Further, another object of the invention is to provide a pre-wind type camera in which the guide portion is placed at the non-contact position during pre-winding and is shifted to the contact position when the pre-winding is completed.

The present invention in one aspect pertains to a camera, comprising a head unit which writes into and/or reads from a record carrier provided on a film, the head unit being shiftable between a recording position and a non-recording position, film-conveying means having a first mode for conveying an unexposed frame of the film after an exposure thereof, and controlling means which places the head unit at the non-recording position during the first mode, and at the recording position during the second mode, controlling means being drivingly connected to the film-conveying means.

The present invention in yet another aspect pertains to a camera in which a magnetic head writes into and/or reads from a magnetic record carrier provided on a film, comprising film-conveying means for conveying the film, restricting means for restricting a position of a lengthwise edge surface of the film and which is shiftable between a restricting position and a non-restricting position, and controlling means for maintaining the restricting means at the restricting position and prohibiting the shift of the film to the non-restricting position during the operation of the magnetic head.

The present invention in still another aspect pertains to a camera having a cartridge and a spool in which a magnetic head writes into and/or reads from a magnetic record carrier provided on a film, comprising film-conveying means for conveying the film between the cartridge and the spool, restricting means for restricting a position of a lengthwise edge surface of the film and which is shiftable between a restricting position and a non-restricting position; and controlling means which maintains the restricting means at the non-restricting position until the film-conveying means has conveyed a predetermined length of the film from the front thereof out of the cartridge onto the spool and then allows the restricting means to shift to the restricting position.

The present invention in a further aspect pertains to a camera in which a magnetic head writes into and/or reads from a magnetic record carrier provided on a film, comprising film-conveying means for conveying the film, restricting means for restricting a position of a lengthwise edge surface of the film and which is shiftable between a restricting position and a non-restricting position, and controlling means for shifting said restricting means between the restricting and the non-restricting positions.

Further objects of the invention will become apparent, hereinafter, from the description of the preferred embodiments of the invention with reference to the drawings.

DESCRIPTION OF THE PREFERRED EMBODIMENTS

FIGS. 1 to 7 illustrate a first embodiment of the present invention.

Figure 1:
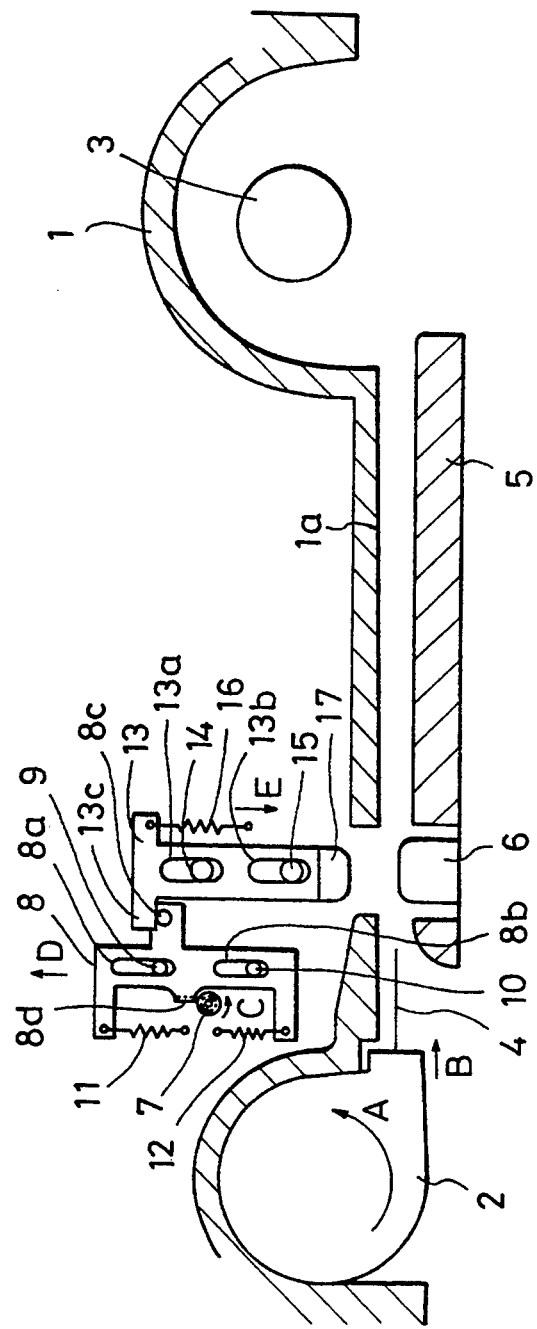
FIG. 1 is a partial cross-sectional view of components relating to film-conveying according to a first embodiment of the present invention, in a state where a film is being rewound.

With reference to FIG. 1, a thrust-type film cartridge 2 includes a film spool (not shown) which engages with a fork (not shown) provided in a camera body 1. The fork and a film-winding spool 3 are driven by a driving mechanism which will be described below. A film 4 having a magnetic storage portion is forced out of the cartridge 2 and conveyed in the direction indicated by an arrow B by means of rotating the fork in the direction indicated by an arrow A. A film platen 5 is mounted on the camera body 1 in such a way that there is provided a predetermined gap between the film platen 5 and a film-guiding surface 1a of the camera body 1. A magnetic head 6 is fixed on the film platen 5. The magnetic head 6 presses the magnetic storage portion of the film 4 to record and/or reproduce information.

A release gear 7 is connected by way of a speed-reducing gear train to a film-conveying motor (not shown) so that when the motor winds the film 4, i.e., to rotate the fork in the direction indicated by an arrow A, the release gear 7 rotates in the direction indicated by arrow C. A release lever 8 is slidably connected to the camera body 1 by way of the association of long holes 8a, 8b provided in the release lever 8 with pins 9, 10 provided on the camera body 1. The release lever 8 has a rack portion 8d which engages with the release gear 7. Springs 11, 12 are each connected at one end thereof to the release lever 8 and at the other end to the camera body 1. The spring 12 pulls the release lever 8 in the direction indicated by an arrow D, whereas the spring 11 pulls the release lever 8 in the opposite direction.

Figure 2:
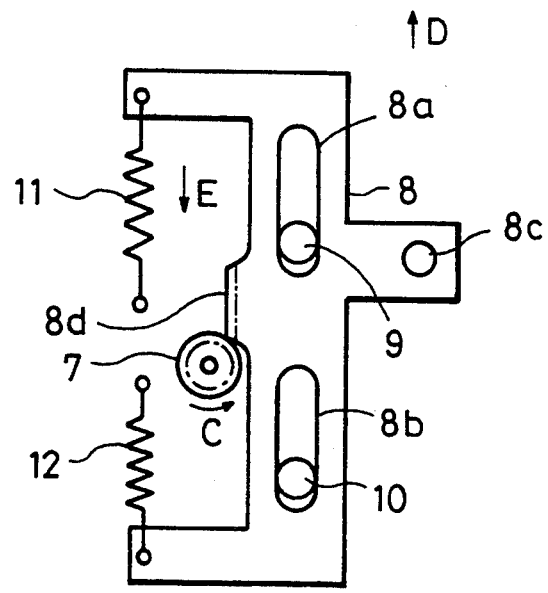
FIG. 2 is an enlarged plan view of a release gear and a release lever shown in FIG. 1.

In the state illustrated in FIGS. 1 and 2, the resultant force of the springs 11 and 12 acts on the release lever 8 in the direction indicated by an arrow E. In the state shown in FIGS. 3 and 4, the resultant force thereof acts on the release lever 8 in the direction indicated by the arrow D.

A pressing lever 13 is slidably connected to the camera body 1 by way of the association of long holes 13a, 13b provided in the pressing lever 13 with pins 14, 15 provided on the camera body 1. A spring 16 is connected at one end to the pressing lever 13 and at the other end to the camera body 1. The spring 16 pulls the lever 13 in the direction E. The pressing lever 13 has a pad 17 for pressing the film 4 onto the head 6.

A camera according to this embodiment is a so-called pre-wind type. First, the film 4 is completely wound on the winding spool 3, and then the film 4 is rewound into the cartridge 2, one frame for each exposure. The operation is performed according to a known sequence.

Figure 3:
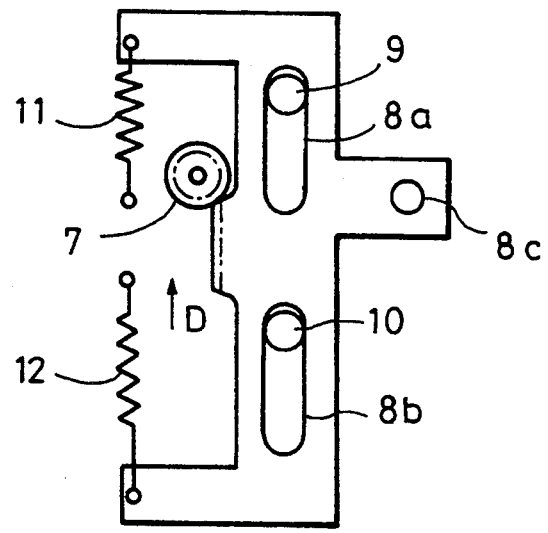
FIG. 3 is an enlarged plan view of the release gear and the release lever shown in the FIG. 2 when a film is being rewound.

With reference to FIG. 1 through FIG. 3, the film-conveying motor (not shown) rotates in such a direction that the film 4 is wound on the spool 3, and that the release gear 7 is driven in the direction indicated by an arrow C. The rotation of the release gear 7 carries the release lever 8 in the direction indicated by the arrow D for a short period while the release gear 7 engages with the rack 8d. When the release gear 7 has completed its engagement with the rack 8d, the release lever 8 stops. The release lever 8 has a pin 8c which bears against an arm 13c of the pressing lever 13, so that the pressing lever 13 is held in a position as shown in FIG. 1. Naturally, the pad 17 on the pressing lever 13 stays away from the film-conveying path to allow the film tip to pass.

The film-conveying motor continues to convey the film 4, so that the film 4 coils around the winding spool 3, assisted by a known means, such as a rubber roller or a hook.

Figure 4:
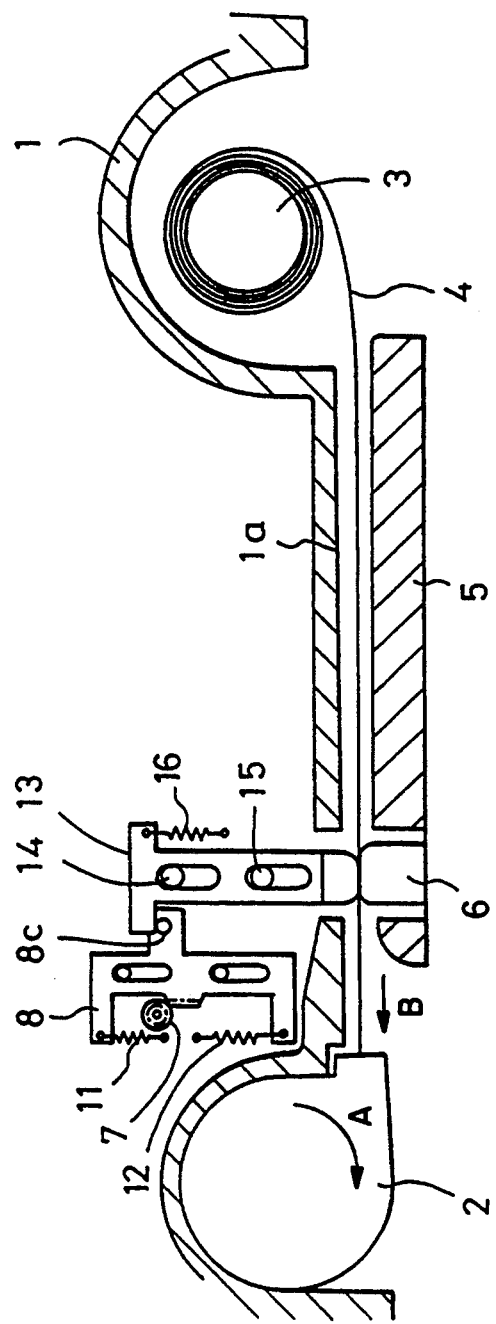
FIG. 4 is a partial cross-sectional view of the components relating to film-conveying according to the first embodiment of the invention, illustrating the operation thereof when a film is being rewound.

Now with reference to FIG. 4, when the film 4 is completely wound on the winding spool 3 and resists further winding, the mode is switched to the film-rewinding mode by a known means, reversing the rotation of the film-conveying motor as indicated by the arrow A causing the film to move in the direction indicated by the arrow B. Naturally, the rotation of the release gear 7 is also reversed, so that the release gear 7 engages with the rack 8d because the release lever 8 is receiving a force in the direction indicated by the arrow E, i.e., both the resultant force of the springs 11 and 12 and the force of the spring 16 through the pressing lever 13. Then, the release lever 8 moves in the direction indicated by the arrow E. Thus, the pressing lever 13 is moved by the restoration force of the spring 16 until the pad 17 presses the film 4 onto the magnetic head 6, as shown in FIG. 4. Because the pin 8c of the release lever 8 parts from the arm 13c of the pressing lever 13 before the release gear 7 has run through the rack portion 8d so as not to engage with the rack portions 8d any longer, the release lever 8 stays in the position as shown in FIGS. 3 and 4.

Even when the film-conveying motor (not shown) stops, the release lever 8 will not move in the direction indicated by the arrow D in spite of the resultant force of the springs 11 and 12 because the release gear 7 is connected to the motor through the speed-reducing gear train; the release gear 7 will not rotate when the motor stops. Therefore, the pad 17 constantly presses against the film 4 to secure the contact between the head 6 and the magnetic storage portion of the film 4 while the film 4 is rewound into the cartridge 2 one frame at a time. Thus, when an exposed frame is being conveyed, the magnetic head 6 can reliably write (and-/or read) a large amount of information.

Next, the film-conveying mechanism according to this embodiment of the invention will be described.

Figure 5:
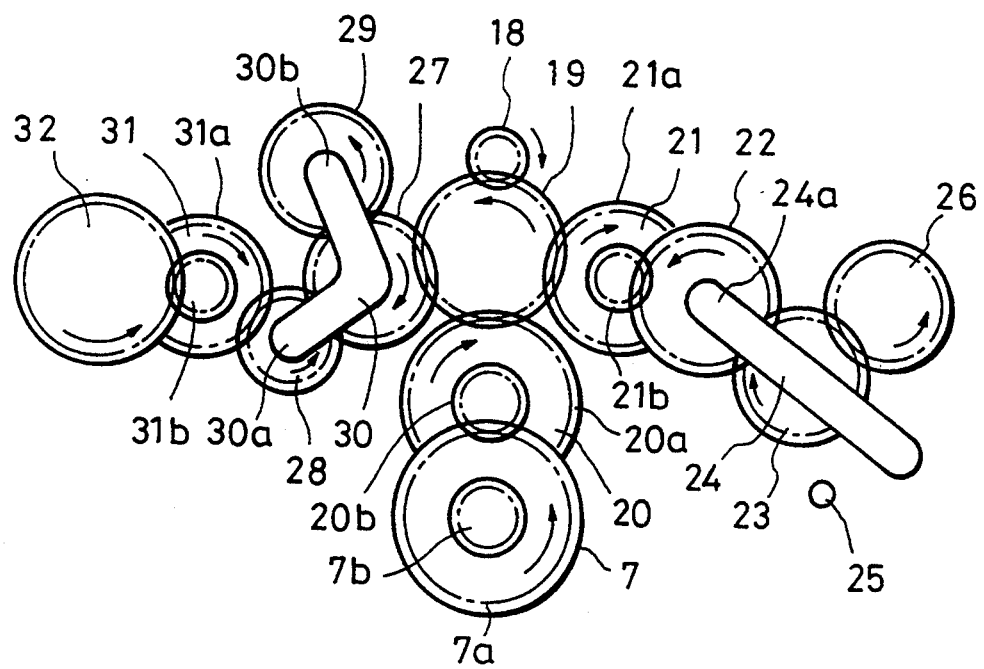
FIGS. 5 to 7 are plan views of film-conveying gear trains according to the first embodiment of the invention.
Figure 6:
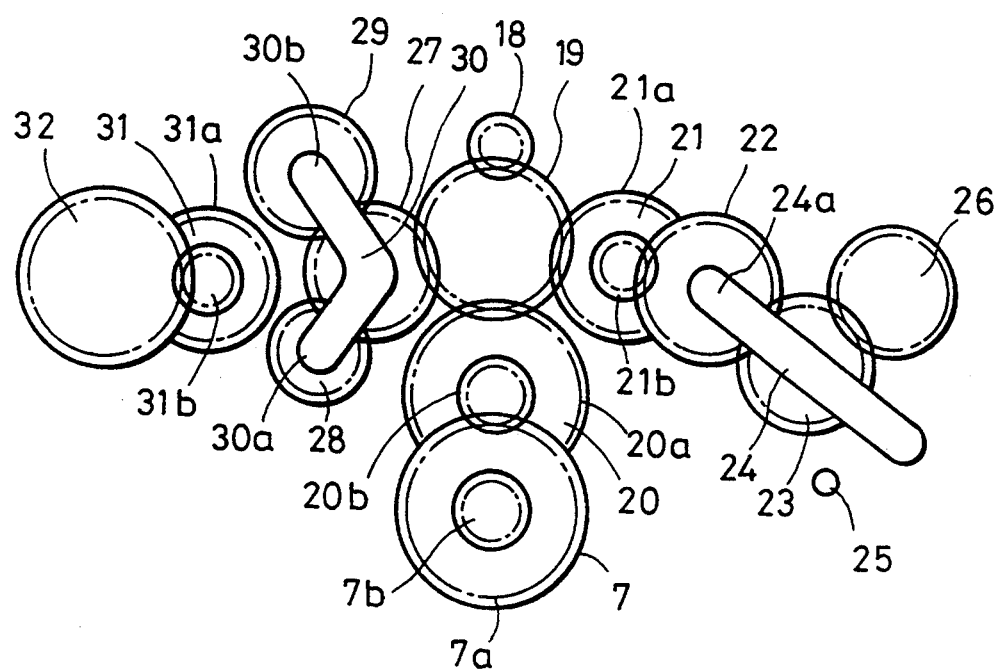
Figure 7:
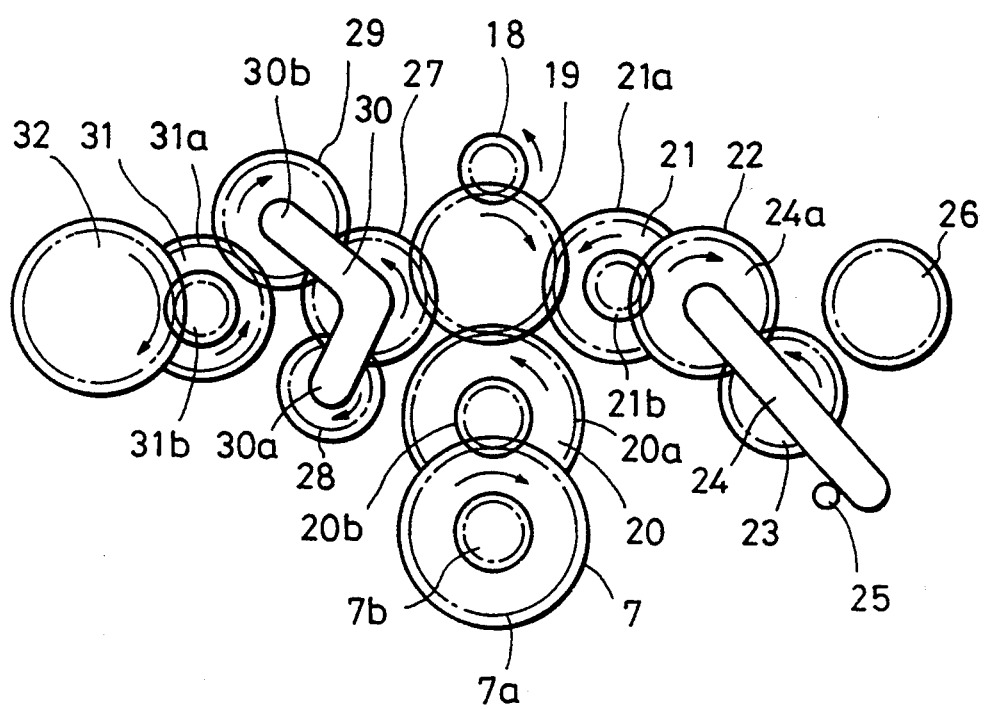

With reference to FIGS. 5 to 7, which illustrate film-conveying gear trains, a pinion gear 18 is directly connected to the film-conveying gear (not shown). The pinion gear 18 engages with a first gear 19, which engages a large gear part 20a of a second gear 20. A small gear part 20b of the second gear 20 engages with a large gear part 7a of the release gear 7, whose small gear part 7b engages with the rack portion 8d of the release lever 8.

Through the gear train described above, the rotation of the film-conveying motor is transmitted to the release gear 7 with the rotational speed sufficiently reduced.

The first gear 19 also engages with a large gear part 21a of a first spool gear 21. A small gear part 21b engages with a second spool gear 22, which engages with a spool planet gear 23. A spool planet-connecting lever 24 is pivotably connected to the second spool gear 22 at the center 24a and connects the spool planet gear 23 to the second spool gear 22. As in a known planet means, the lever 24 rotatably supports the planet gear 23 but with some friction force generated therebetween, so that the planet gear 23 revolves around the second spool gear 22 in the direction according to the rotational direction of the second spool gear 22.

A stopper 25 is provided on the camera body 1 and restricts the clockwise rotation of the spool planet-connecting lever 24. A third spool gear 26 engages with the spool planet gear 23 and is directly connected to the film-winding spool 3.

The first gear 19 also engages with a fork sun gear 27, which engages with first fork and second fork planet gears 28, 29. A fork planet-connecting lever 30 is pivotably connected to the center of the fork sun gear 27. As in a known planet gear means, the planet-connecting lever 30 supports the first and second planet gears 28, 29 so that the planet gears 28, 29 can revolve around the fork sun gear 27 in the direction according to the rotational direction of the sun gear 27.

A large gear part 31a of a first fork gear 31 is designed to engage with either one of the two planet gears 28 or 29. A second fork gear 32 is directly connected to the fork (not shown) and engages with a small gear part 31b of the first gear 31.

FIG. 5 shows the same state as shown in FIG. 1, where the film-conveying motor (not shown) is rotating in such a direction that the film 4 is being sent out of the cartridge 2 and is being wound on the film-winding spool 3. Each of the gears is rotating in the directions as indicated by the arrows.

It is designed that the speed V1 of the film being wound by the film-winding spool 3 is greater than the speed V2 of the film being pushed out of the cartridge 2 by the fork (V1>V2). Consequently, when the film 4 is wound around the spool 3, the driving torque of the spool 3 is transmitted through the film 4 to the second fork gear 32 and then to the first fork gear 31, potentially increasing the rotational speeds thereof. In such a case, the first fork gear 31 kicks off and disengages with the first planet gear 28, as shown in FIG. 6, for a moment, allowing for faster rotations thereof.

FIG. 7 shows the same state as that shown in FIG. 4, where the film-conveying motor is rotating in such a direction that the film 4 is being rewound into the cartridge 2. Each of the gears is rotating in the directions as indicated by the arrows.

Figure 8:
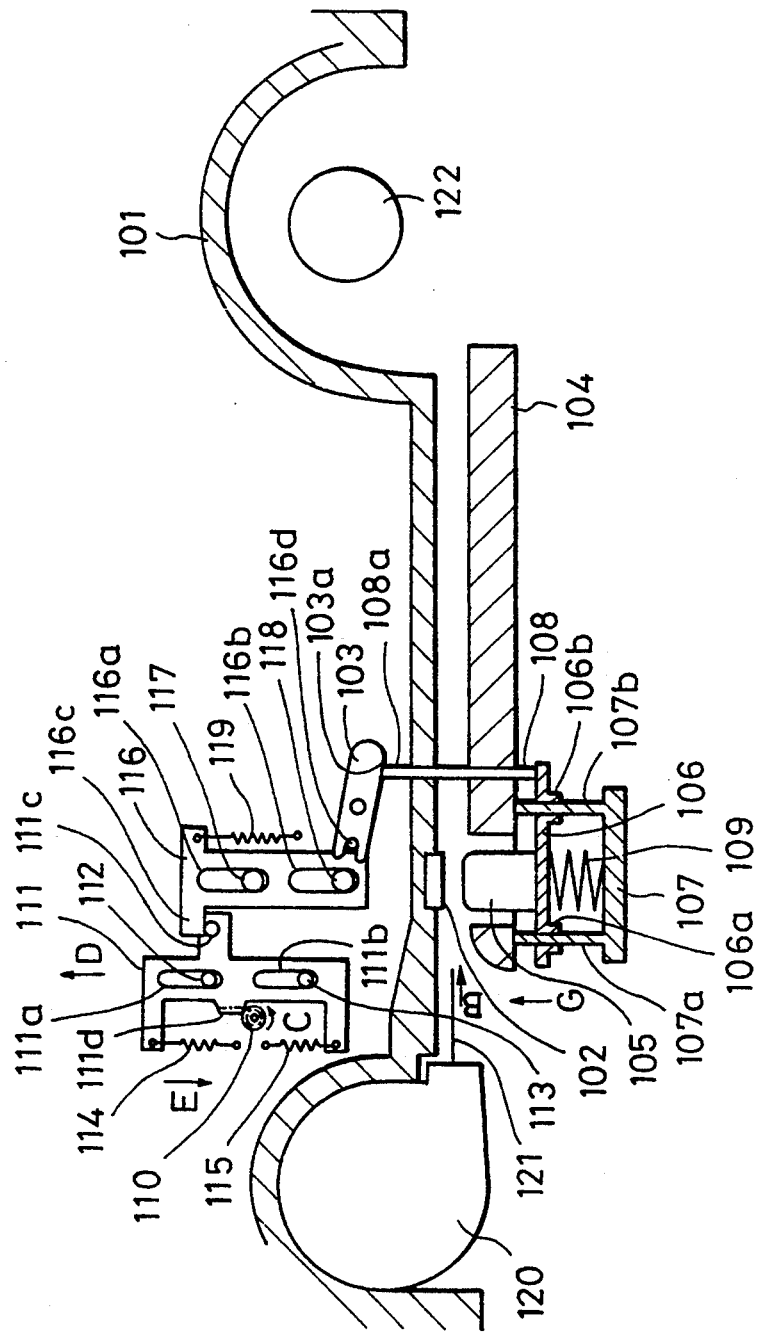
FIG. 8 is a partial cross-sectional view of components relating to film-conveying in a second embodiment of the present invention, in a state where a film is being wound.
Figure 9:
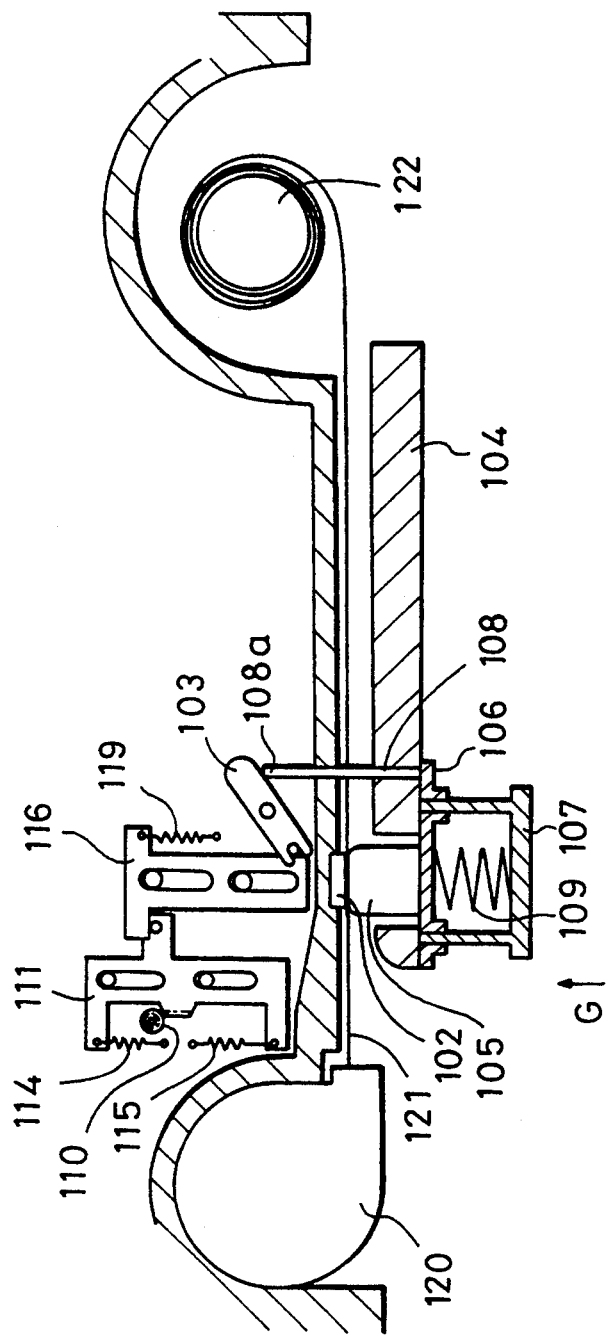
FIG. 9 is an enlarged plan view of the release gear and the release lever shown in the FIG. 2, when a film is being rewound.
Figure 10:
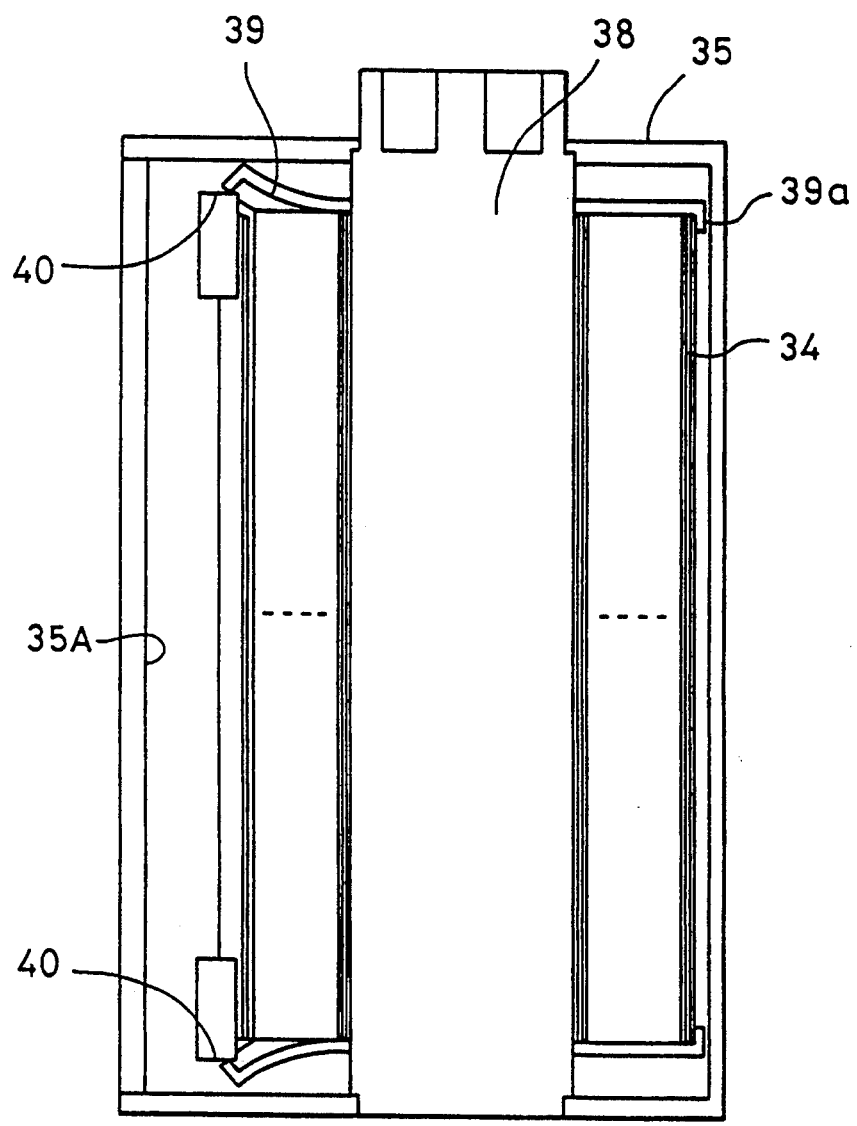
FIG. 10 is a longitudinal section of a thrust type film cartridge employed in the embodiments of the present invention.
Figure 11:
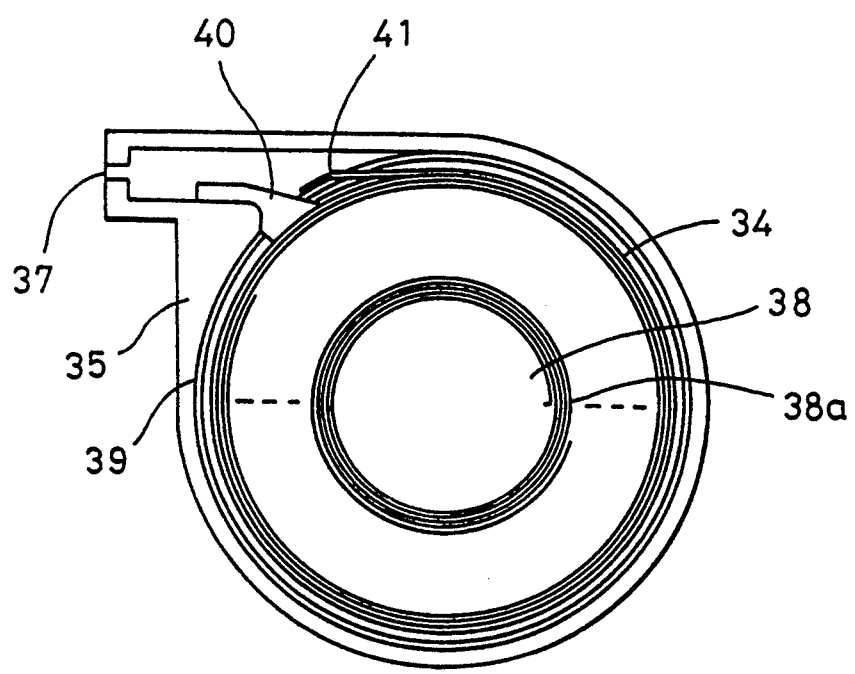
FIG. 11 is a transverse section of the film cartridge shown in FIG. 10.
Figure 12:
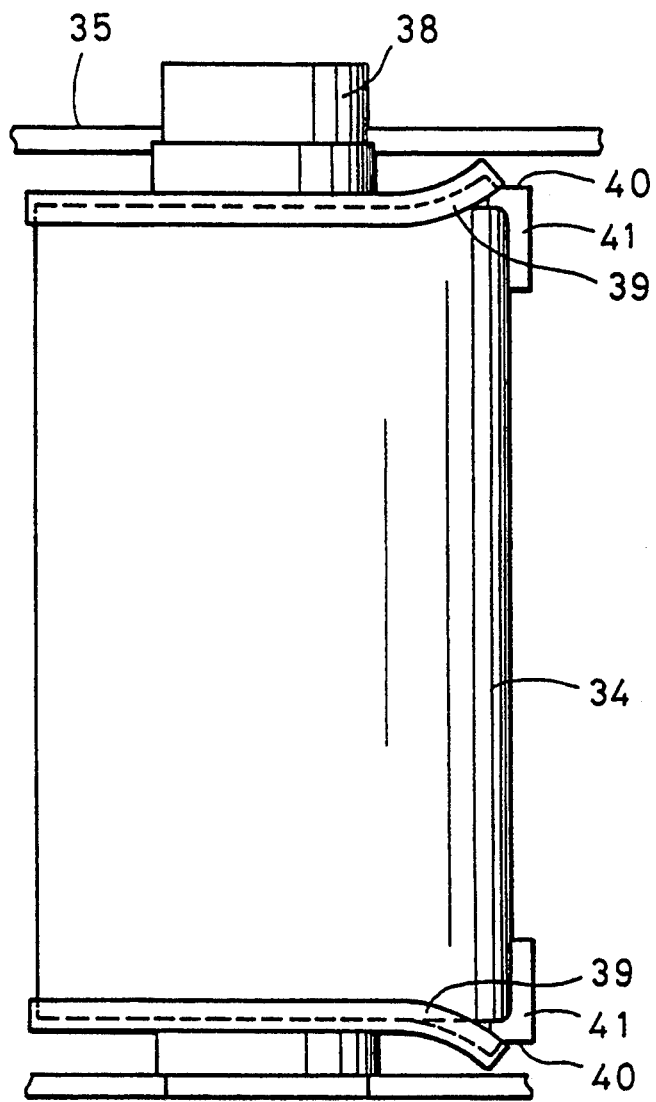
FIG. 12 is a side elevation of the same as in FIG. 10.

FIGS. 8 and 9 illustrate a camera according to the second embodiment of the present invention. In the second embodiment, a pad is fixed and a magnetic head is moved by the film-conveying motor whereas, in the first embodiment, the pad is moved by the motor.

Referring to FIG. 8, a pad 102 is fixed on a camera body 101 and functions to support a film 121 pressed by a magnetic head 105. A connecting lever 103 is rotatably connected to the camera body 101. The magnetic head 105 is fixed onto a mounting plate 106. The mounting plate 106 is slidably connected to a base 107 which is fixed onto a film platen 104. Sleeves 106a, 106b of the mounting plate 106 are slidably fitted on shafts 107a, 107b of the base 107. A supporting rod 108 is fixed to the mounting plate 106 and is designed so that a tip 108a thereof abuts on an arm 103a of the connecting lever 103. A contracted spring 109 pushes the mounting plate 106 in the direction indicated by an arrow G, i.e., in such a direction as to press the magnetic head 105 onto the film 121.

A release gear 110 is provided in the same manner as in the first embodiment. A release lever 111 is slidably connected to the camera body 101; long holes 111a, 111b of the lever 111 are slidably associated with pins 112, 113 provided on the camera body 101. The release lever 111 has a rack portion 111d which engages with the release gear 110. Springs 114, 115 are connected at one end thereof to the camera body 101 and at the other end to the release lever 111. A pressing lever 116 is also slidably connected to the camera body 101; long holes 116a, 116b of the lever 116 are slidably associated with pins 117, 118 provided on the camera body 101. An arm 116c of the pressing lever 116 is engaged with a pin 111c of the release lever 111. A pin 116d of the pressing lever 116 is slidably fitted in a recess 103a of the connecting lever 103. A spring 119 is connected at one end thereof to the camera body 101 and at the other end to the pressing lever 116, and pulls the pressing lever 116 towards the film 121. There are also shown a thrust type film cartridge 120 and a film-winding spool 122.

The film-conveying mechanism is the same as that in the first embodiment, and the description and the drawings thereof are omitted herein.

In FIG. 8, the film-conveying motor (not shown) rotates in such a direction that the film 121 is wound on the spool 122. The release gear 110 rotates in the direction indicated by the arrow C, so that the release lever 111 completes its movement in the direction shown by the arrow D. Also, the pressing lever 116 is held at a position shown in FIG. 8 since the pin 111c of the release lever 111 engages with the arm 116c of the pressing lever 116, thus holding the connecting lever 103 by the the pin 116d of the pressing lever 116 fitted in the recess 103a of the connecting lever 103. Thus, the supporting rod 108, being stopped at its tip 108a by the lever 103, supports the mounting plate 106 and thus keeps the magnetic head 105 off the film-conveying path.

The film-conveying motor continues to convey the film 121, so that the film 121 coils around the winding spool 122, helped by a known means, such as a rubber roller or a hook.

When the film 121 is completely wound on the winding spool 122 and resists further winding, the film-rewinding mode is started in a known manner, reversing the rotation of the film-conveying motor. The release gear 110 rotates in the reversed direction. Thus, as in the first embodiment, the release and pressing levers 111, 116 move in the direction shown by the arrow E to the position shown in FIG. 9. Accordingly, the connecting lever 108 rotates clockwise, so that the spring is released to expand, pushing the mounting plate 106, the supporting rod 108 and the magnetic head 105. Finally, the head 105 is pressed onto the film 121 against the pad 102, completing its contact position.

A pre-wind type camera according to the foregoing embodiments eliminates the problems of the tip of a film being caught by a pad or a magnetic head and thus the film can not be conveyed (forced out) any further, since the pad or the magnetic head is moved and kept away from the film-conveying path by such a rotation of the film-conveying motor that the film is wound on the film-winding spool, as described above. Also, the pressing contact of the magnetic head with a film can be achieved at a low cost, without requiring a specific drive source for such function. Either the pad or the magnetic head is moved to contact the film by the film-conveying motor rotating in such a direction that the film is rewound for exposure one frame at a time.

Further, the magnetic storage portion of the film can be more thoroughly used. In other words, more information can be written into and/or read from such a magnetic storage portion. The magnetic head 105 is pressed onto the film all the time during the film-rewinding mode whereas, in a conventional camera, the pad or the head is shifted to the non-contact position and then back to the contact position every time the film is conveyed for the next frame to be exposed. Also, the sequential control of the camera can thus be simplified.

Figure 13:
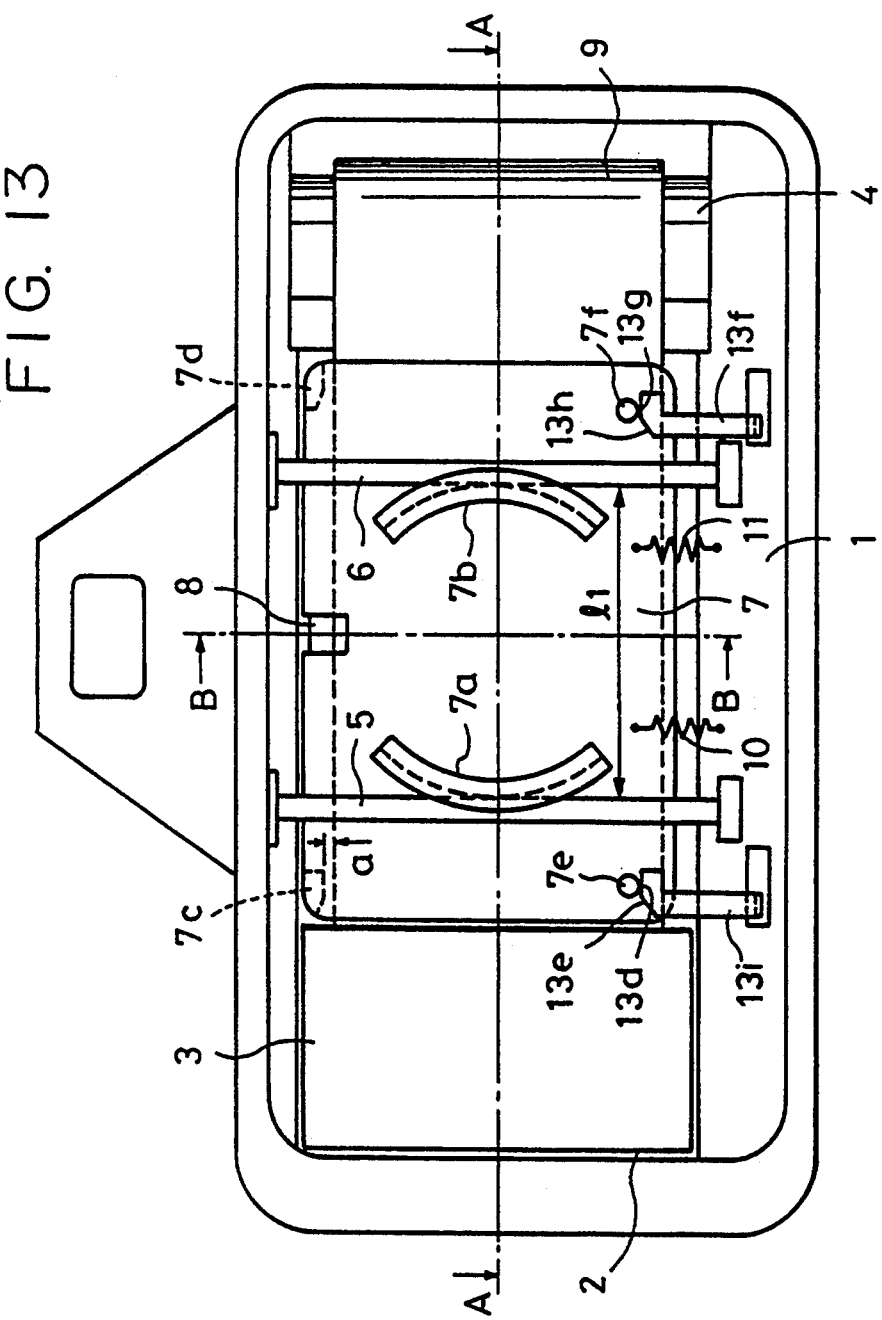
FIGS. 13 and 17 are schematic rear views of a camera according to a third embodiment of the present invention.
Figure 14:
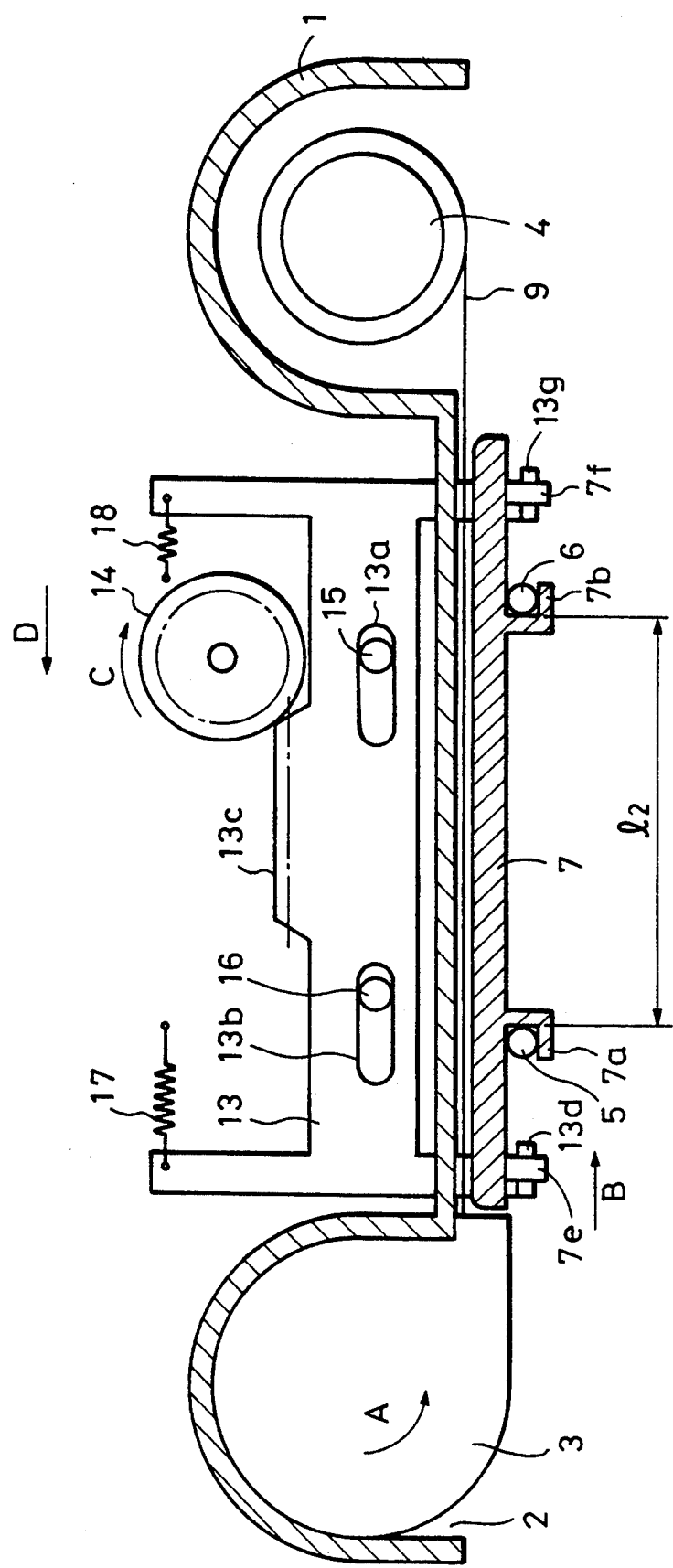
FIG. 14 is a sectional view taken on line A—A of FIG. 13.
Figure 15:
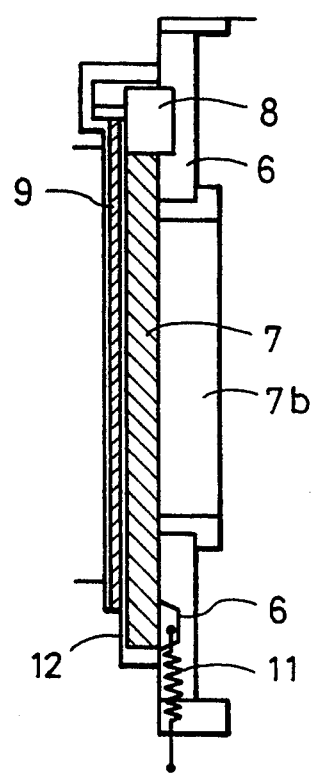
FIG. 15 is a sectional view taken on line B—B of FIG. 13.

Referring to FIGS. 13 to 18, which illustrate a third embodiment of the present invention, there are shown a camera body 1 and a cartridge chamber 2 for accommodating the thrust-type film cartridge 3. A film spool (not shown) provided in the film cartridge 3 engages with a fork (not shown) provided in the camera body 1. There is also shown a film-winding spool 4 for winding a film. Supporting shafts 5, 6 are fixed at both ends thereof to appropriate locations in the camera body 1. The supporting shafts 5, 6 are parallel to each other and perpendicular to the direction of the film-conveying. In this embodiment, the shafts 5, 6 are cylindrically shaped, as shown in FIG. 14.

A film platen 7 has a pair of stoppers 7a, 7b on its side which does not face the film, as shown in FIG. 14. Each of the stoppers 7a, 7b has a substantially L-shaped profile, composed of a portion perpendicular to the film platen 7 and a horizontal portion extending outwards from the perpendicular portion with a substantial right angle therebetween. Each of the stoppers 7a, 7b, as a whole, protrudes in the direction of the lens axis. As illustrated in FIG. 13, which shows a plan view thereof, the stoppers 7a, 7b have circular-arc shapes and are arranged symmetrically with regard to the substantial center of the film platen 7.

As shown in FIG. 14, the distance l2 between the outer sides of the perpendicular portions of the stoppers 7a and 7b is designed to be a little shorter than the inside interval l1 shown in FIG. 13 between the supporting shafts 5 and 6. Central portions of the shafts 5, 6 are surrounded by the film platen 7 and the perpendicular and horizontal portions of the stoppers 7a, 7b. Therefore, the film platen 7 can be slid up or down (in FIG. 13) along the supporting shafts 5, 6 (perpendicularly to the conveying direction of the film 9), and can be rotated with the center of rotation being at the substantial center of the film platen 7. As shown in FIG. 14, the horizontal portions of the stoppers 7a, 7b press the shafts 5, 6 onto the film platen 7, preventing the film platen 7 from moving in the direction of the lens axis.

As shown in FIG. 13, the film platen 7 has guiding portions 7c, 7d at the upper corners on the side facing the film 9. Also, on the same side, the film platen 7 has a magnetic head 8 fixed to an upper portion so that the magnetic gap of the head 8 is perpendicular to the film-conveying direction.

The film 9 has a magnetic storage portion and is pushed in the direction of the arrow B out of the thrust type film cartridge 3 by the fork (not shown) rotating in the direction A, shown in FIG. 14. As shown in FIG. 13, springs 10, 11 are evenly distributed from the rotation center of the plate 7 toward the cartridge room 2 side and the spool 4 side. Each of the springs 10, 11 is connected at one end to the camera body 1 and at the other end to the film platen 7, and pulls the plate 7 downwards.

In this way, the guiding portions 7c, 7d on the film platen 7 are pressed onto the edge of the film 9, maintaining the film platen 7 at a consistent position with respect to the film 9. The film 9 has a magnetic storage portion (not shown) on its side facing the film platen 7. The magnetic storage portion extends in the lengthwise direction of the film 9. Thus, the magnetic head 8 can write into and/or read from the magnetic storage portion various data on picture-taking.

An outer guide 12 restricts the film 9 from moving downwards.

It is necessary to precisely define the position of the magnetic head 8 with regard to the film 9 in the picture-taking mode, particularly when the head 8 writes into and/or reads from the magnetic storage portion when the film 9 is rewound for the next frame. The head 8 can be precisely positioned with regard to the magnetic storage portion of the film 9 in the above construction. The magnetic head 8 is fixed on the film platen 7. The film platen 7 is moved perpendicularly to the conveying direction of the film 9 and is rotated on a plane parallel to the surface of the film 9. The guiding portions 7c, 7d are provided on the film platen 7 in order to restrict the position of the film 9 relative to the magnetic head 8. By the springs 10, 11, the guide portions 7c, 7d are pressed onto the edge of the film 9.

As shown in FIG. 14, a release gear 14 is connected through a speed-reducing gear train to the film-conveying motor so that when the motor rotates in such a direction that the film 9 is wound on the spool 4, i.e., the fork (not shown) rotates in the direction indicated by the arrow A, the release gear 14 rotates in the direction indicated by the arrow C. A release lever 13 is slidably connected to the camera body 1; long holes 13a, 13b provided on the lever 13 are slidably associated with pins 15, 16 provided on the camera body 1. The release lever 13 has a rack portion 13c which is able to engage with the release gear 14. Springs 17, 18 are each connected at one end thereof to the camera body 1 and at the other end to the lever 13. The spring 18 potentially pulls the lever 13 in the direction indicated by the arrow D, and the spring 17 potentially pulls it in the opposite direction.

Figure 16:
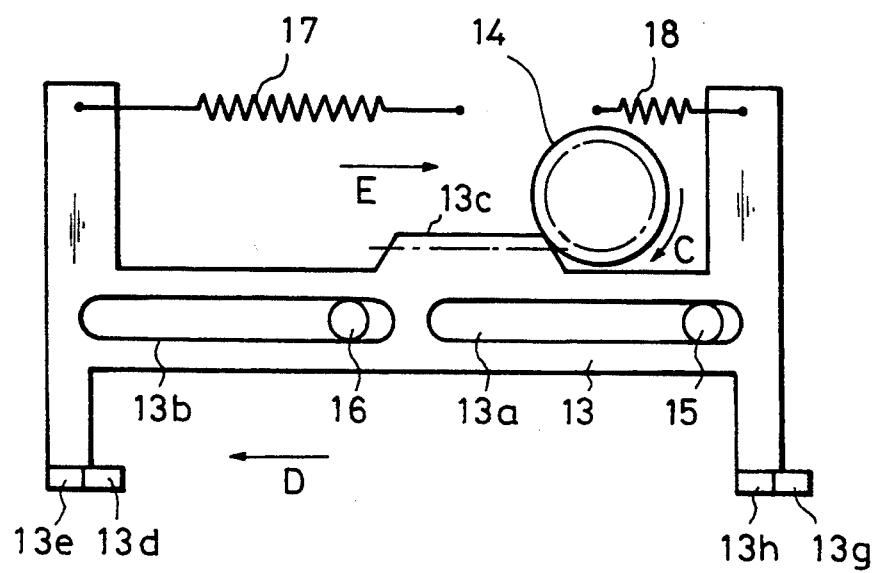
FIGS. 16 and 18 are enlarged plan views of the release lever and related parts shown in FIG. 14.
Figure 17:
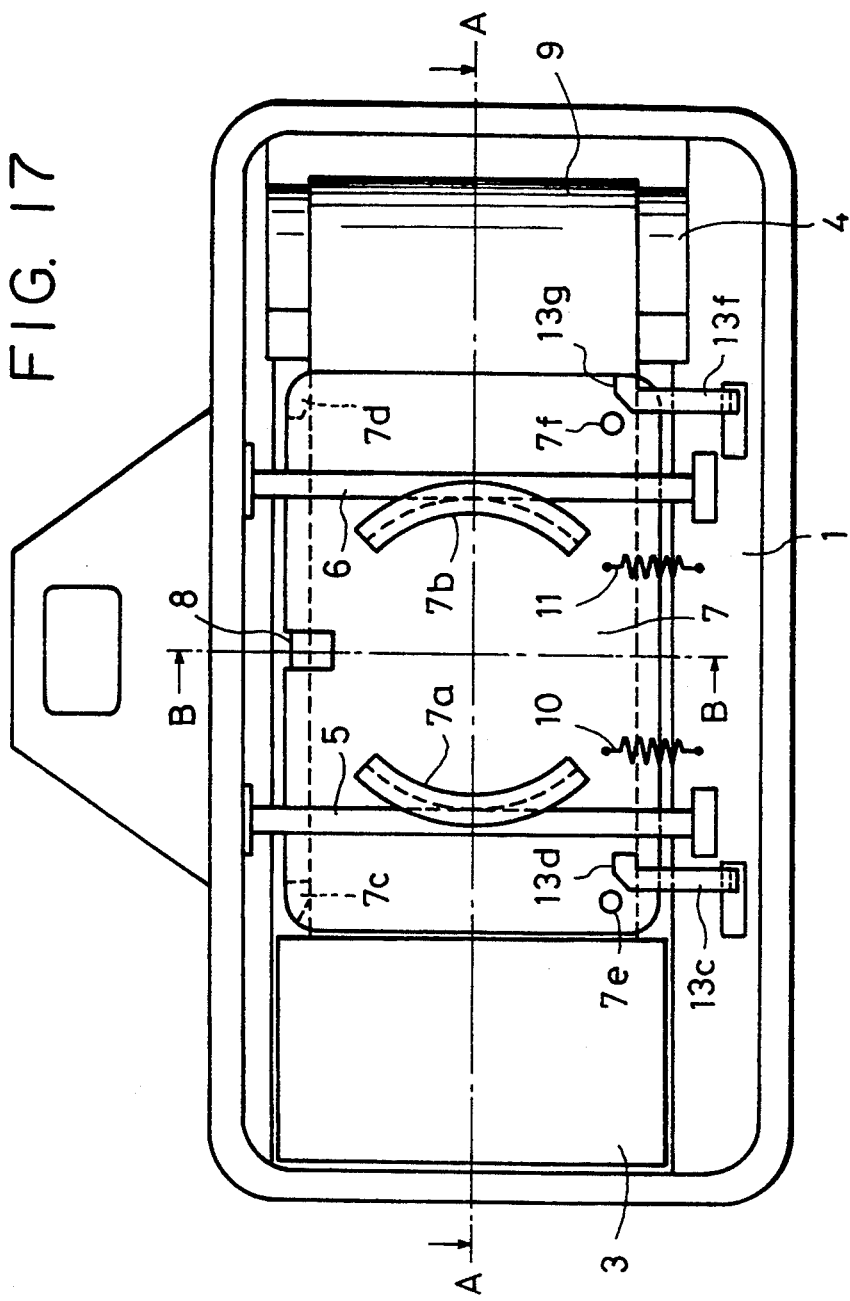
Figure 18:
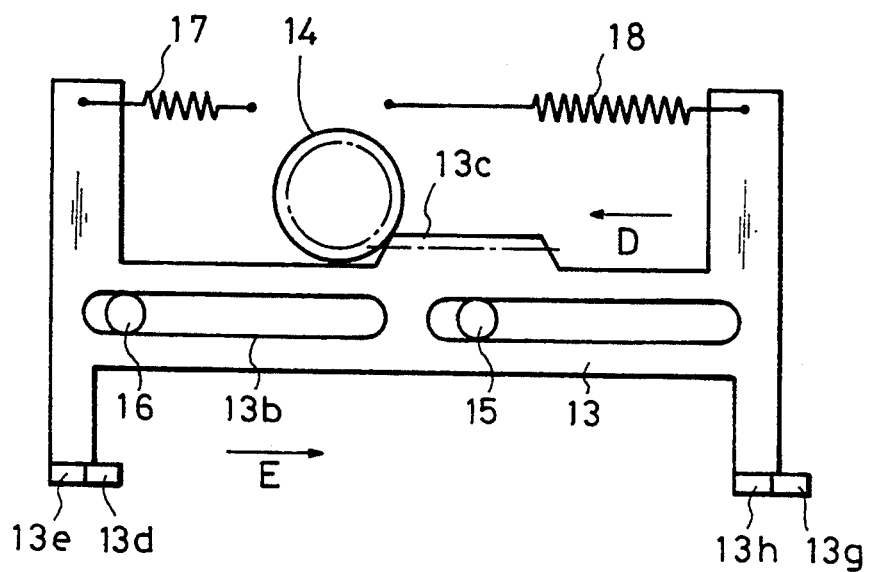

In FIGS. 13, 14 and 16, the resultant force of the springs 17 and 18 acts on the lever 13 in the direction indicated by the arrow E. In FIGS. 17 and 18, the resultant force acts on the lever 13 in the direction indicated by the arrow D.

A camera according to this embodiment of the invention is a so-called pre-wind type. First, the film 9 is completely wound on the winding spool 4, and then the film 9 is rewound one frame after each exposure. The operation is performed under a known sequential control.

In FIG. 16, the film-conveying motor (not shown) rotates in such a direction that the film 9 is wound on the spool 4, and drives the release gear 14 in the direction indicated by the arrow C. The rotation of the release gear 14 carries the release lever 13 in the direction indicated by the arrow D for a short period while the gear 14 engages with the rack 13c. When the release gear 14 completes engaging with the rack 13c, the release lever 13 stops.

In such a state, as shown in FIG. 13, horizontal portions 13d, 13g of arms 13i, 13f of the release lever 13 abut on dowels 7e, 7f on the film platen 7, thus holding the plate 7 upwards. When the plate 7 is positioned in this way, the film 9 can be conveyed freely since a clearance a is provided between the guiding portions 7c, 7d and the upper edge of the conveying path of the film 9.

The film-conveying motor continues to carry the film 9, so that the film 9 coils round the winding spool 3, helped by a known means, such as a rubber roller or a hook.

When the film 9 is completely wound on the winding spool 4 and resists further winding, the mode is switched to the film-rewinding mode in a known manner, reversing the rotation of the film-conveying motor. Naturally, the rotation of the release gear 14 is also reversed, so that the gear 14 engages with the rack 13c because the release lever 13 is receiving a resultant force of the springs 17, 18 in the direction indicated by the arrow E. Thus, the release lever 13 is moved in the direction indicated by the arrow E by the release gear 14. When the release gear 14 has run through the rack 13c, the release lever 13 stops and stays at a position shown in FIGS. 17, 18.

Even when the film-conveying motor (not shown) stops, the release lever 13 will not move in the direction indicated by the arrow D in spite of the resultant force of the springs 17 and 18 because the release gear 14 is connected to the motor through the speed-reducing gear train; the release gear 14 will not rotate when the motor stops.

When the release lever 13 moves in the direction indicated by the arrow E shown in FIG. 18, the horizontal portions 13d, 13g thereof leave the dowels 7e, 7f on the film platen 7, as shown in FIG. 17. Thus, the springs 10, 11 are released, contracting to pull the plate 7 downwards until the guiding portions 7c, 7d press the upper edge of the film 9. In this way, the magnetic head 8 is precisely positioned with regard to the magnetic storage portion of the film 9 so that recording and/or reproducing of information can be precisely performed.

The film 9 is transported to the cartridge 3 one frame after each exposure. In such a case, the position of the magnetic head 8 with regard to the storage portion of the film 9 is maintained since the guiding portions 7c, 7d continue abutting on the upper edge of the film 9 by the restoration force of the springs 10, 11.

When the film cartridge 3 is replaced and the film-conveying motor operates so as to automatically load the film, the rack 13c engages with the rotating gear 14 since the resultant force of the springs 17 and 18 acts on the release lever 13 in the direction indicated by the arrow D, as shown in FIG. 18. Then, the lever 13 moves in the direction indicated by the arrow D. During this movement, tapered portions 13e, 13h of the arms 13c, 13f of the lever 13 contact the dowels and push the film platen 7 up against the restoration force of the springs 10, 11, and then the horizontal portions 13d, 13g abut on the dowels 7e, 7f, thus holding the plate 7 in the position. In this way, the camera is again in the state shown in FIGS. 13, 14 and 16.

Next, the film-conveying mechanism in this embodiment of the invention will be described.

Figure 19:
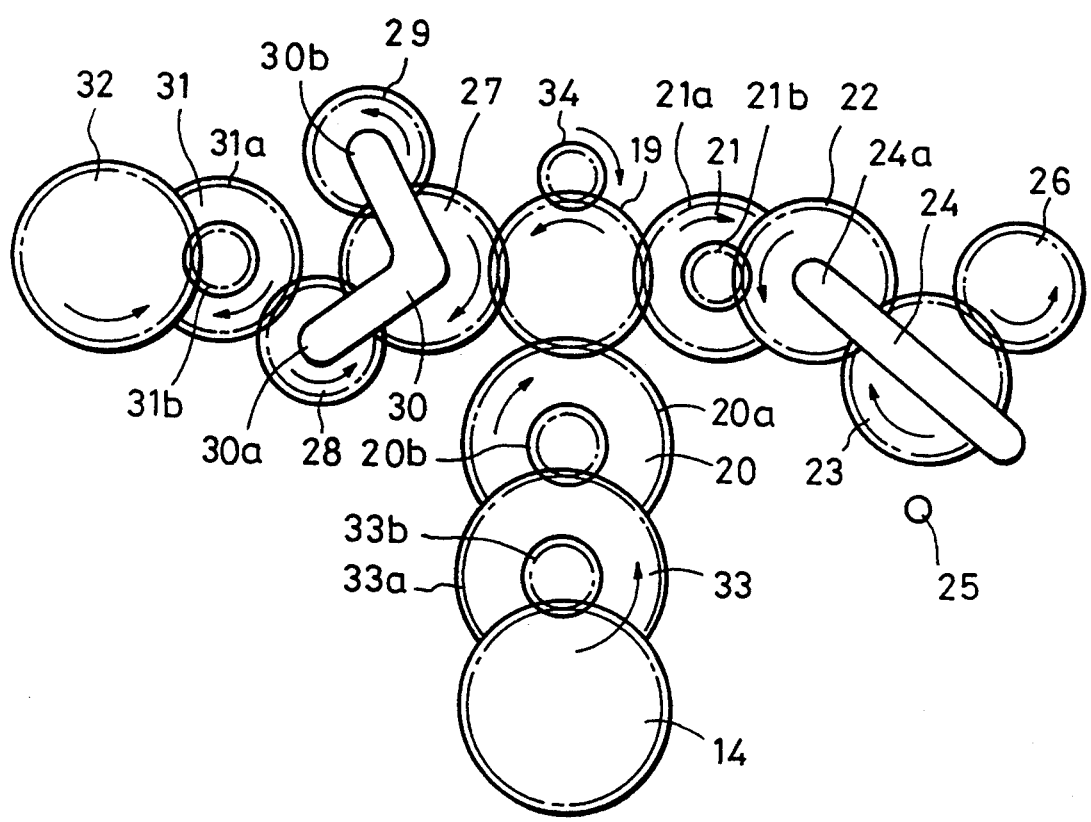
FIGS. 19 to 21 are plan views of a film-conveying gear train in the third embodiment of the present invention.
Figure 21:
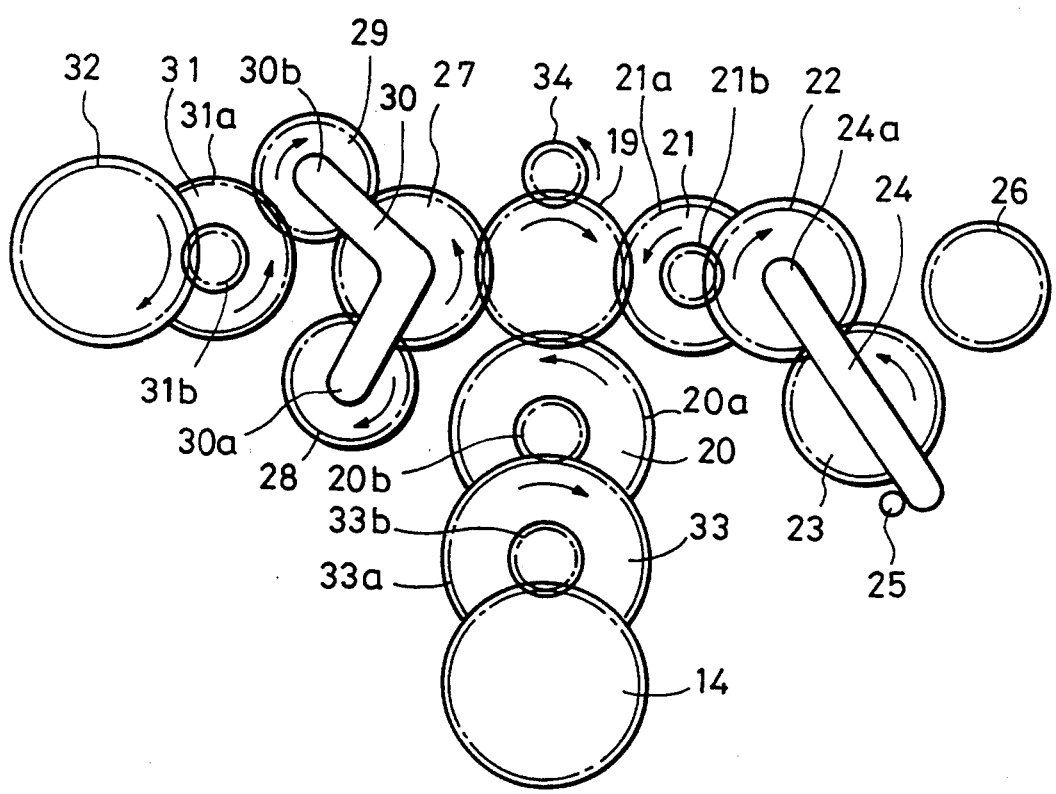

Referring to FIGS. 19 and 21, a pinion gear 34 is directly connected to the film-conveying gear (not shown). The pinion gear 34 engages with a first gear 19, which engages a large gear part 20a of a second gear 20. A small gear part 20b of the second gear 20 engages with a large gear part 33a of a third gear 33, whose small gear part 33b engages with the release gear 14.

Through the gear train described above, the rotation of the force of the motor is transmitted to the release gear 14 with the rotational speed sufficiently reduced.

The first gear 19 also engages with a large gear part 21a of a first spool gear 21. A small gear part 21b engages with a second spool gear 22, which engages with a spool planet gear 23. A spool planet-connecting lever 24 is pivotably connected to the second spool gear 22 at the center 24a and connects the spool planet gear 23 to the second spool gear 22. As in a known planet gear means, the planet-connecting lever 24 supports the planet gear 23 rotatably but with some friction force generated therebetween, so that the planet gear 23 revolves around the second spool gear 22 in the direction according to the rotational direction of the second spool gear 22.

A stopper 25 is provided on the camera body 1 and restricts the clockwise rotation of the spool planet-connecting lever 24. A third spool gear 26 is able to engage with the spool planet gear 23 and is directly connected to the film-winding spool 4.

The first gear 19 also engages with a fork sun gear 27, which engages with first fork and second fork planet gears 28, 29, respectively. A fork planet-connecting lever 30 is pivotably connected to the center of the fork sun gear 27. As in a known planet gear means, the fork planet-connecting lever 30 supports the first and second planet gears 28, 29 so that the planet gears 28, 29 can revolve around the fork sun gear 27 in a direction according to the rotational direction of the fork sun gear 27.

A large gear part 31a of a first fork gear 31 engages with one of the two planet gears 28 or 29. A second fork gear 32 is directly connected to the fork (not shown) and engages with a small gear part 31b of the first gear 31.

FIG. 19 shows the same state as shown in FIG. 13, where the film-conveying motor (not shown) is rotating in a direction that the film 9 is being sent out of the cartridge 3 and being wound on the film-winding spool 4. Each of the gears is rotating as indicated by the arrows.

Figure 20:
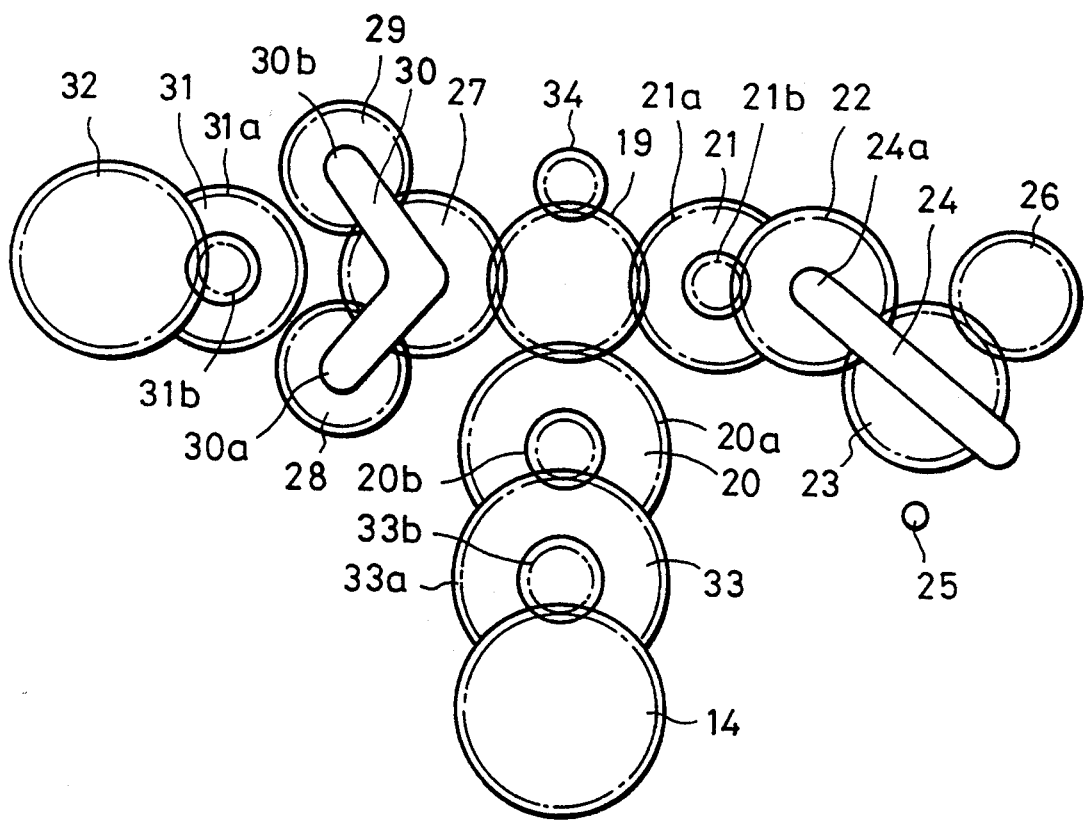

The speed V1 of the film being wound by the film-winding spool 4 is greater than the speed V2 of the film being pushed out of the cartridge 2 by the fork (V1>V2). Consequently, when the film 9 is wound around the spool 4, the driving torque of the spool 4 is transmitted through the film 9 to the second fork gear 32 and then to the first fork gear 31, potentially increasing the rotational speeds thereof. In such a case, the first fork gear 31 kicks off and disengages with the first planet gear 28, as shown in FIG. 20, for a moment, allowing for the faster rotations thereof.

FIG. 21 shows the same state as shown in FIG. 17, where the film-conveying motor is rotating in such a direction that the film 9 is being rewound into the cartridge 3. Each of the gears is rotating as indicated by the arrows.

Figure 22:
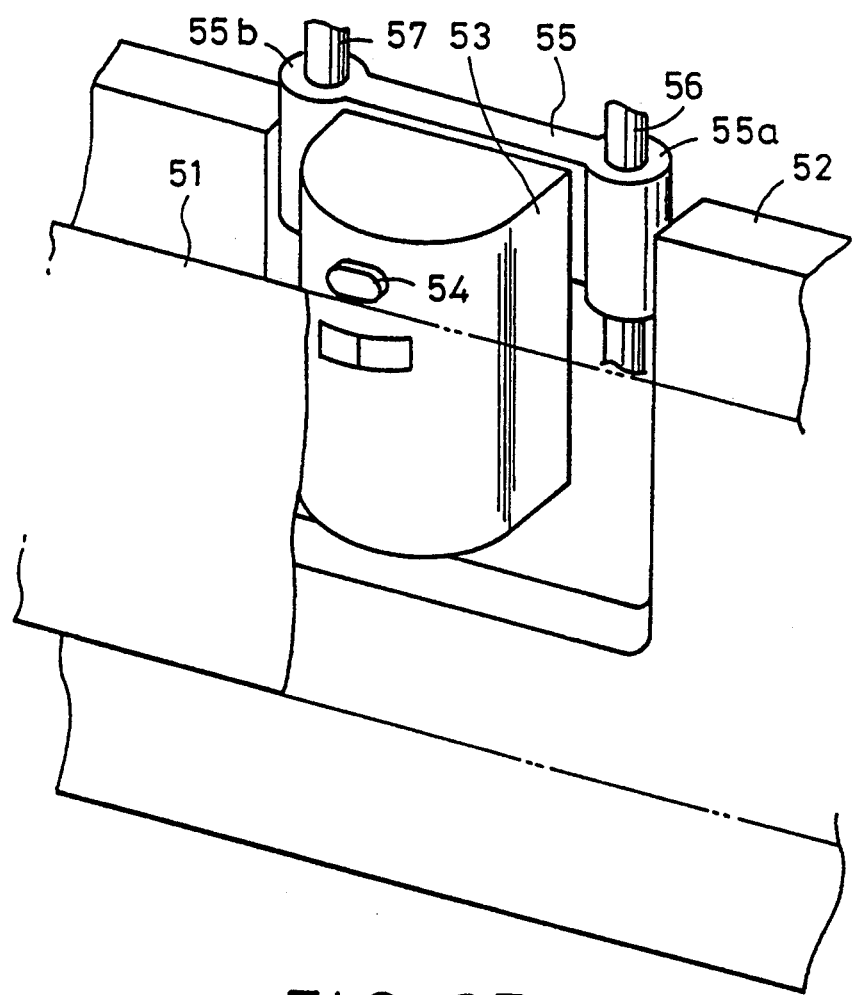
FIG. 22 is a partial perspective view of a camera, showing a main portion according to a fourth embodiment of the present invention.
Figure 23:
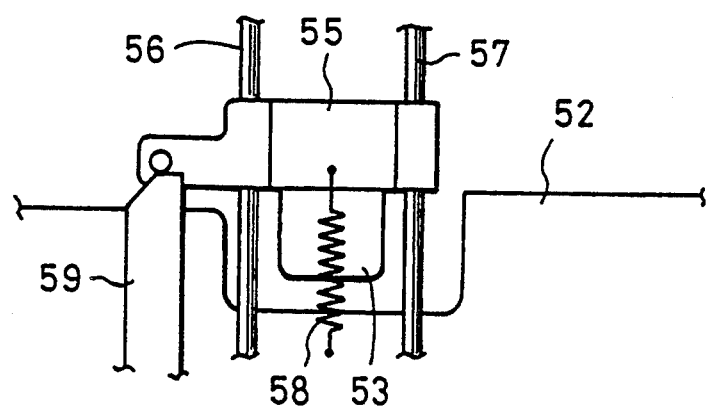
FIG. 23 is a partial rear view of the portion shown in FIG. 22.

FIGS. 22 and 23 illustrate the main components in a fourth embodiment of the present invention, wherein: a film platen is fixed to a camera body; a magnetic head carries a guiding element; and the magnetic head can be moved perpendicularly to the film-conveying direction.

A film 51 has a magnetic storage portion. A film platen 52 is fixed to a camera body (not shown). A guiding element 54 is fixed onto a magnetic head 53 and is designed to abut on the upper edge of the film 51. The head 53 is mounted on a mounting plate 55. Supporting shafts 56, 57 are fixed to the camera body and are slidably fitted through sleeves 55a, 55b. A spring 58 is connected at one end thereof to the mounting plate 55 and at the other end to the film platen 52. By the spring 58, the guiding element 54 is pressed onto the upper edge of the film 51. A release lever 59 is provided for positioning the magnetic head 53.

Other parts of this embodiment are substantially as shown in the third embodiment.

As in the third embodiment, when the film-conveying motor rotates in such a direction that the film is wound and that a release gear 14 rotates in the direction of the arrow C, as shown in FIG. 16, the release lever 59 moves to raise the assembly of mounting plate 55, the head 52 and the guiding element 54 against the restoration force of the spring 58, as shown in FIG. 23. Thus, a clearance is provided between the guiding element 54 and the upper edge of the film 51, as shown in FIG. 13, thus allowing a film tip to smoothly move without touching the guiding element 54.

When the film-conveying motor rotates in such a direction that the film is rewound and that the release gear 14 rotates in the same direction as in FIG. 18, the release lever 59 shifts toward the right-hand side in FIG. 23. Thus the spring 58 is released, contracting to pull down the assembly (the mounting plate 55, the head 52 and the guiding element 54) until the guiding element 54 abuts on the upper edge of the film 51. Therefore, the magnetic head 54 keeps a constant position with regard to the film 51.

Thus, either the third or fourth embodiment eliminates the problem that when a film is automatically loaded, the tip of a film is caught by a guiding portion or element and thus the film can not be conveyed (forced out) any further, since the guiding portion or element is moved and kept off the film-conveying path by the film-conveying motor rotating in such a direction that the film is wound on the film-winding spool.

While the present invention has been described with respect to what presently are considered to be the preferred embodiments, it is to be understood that the invention is not limited to the disclosed embodiments. To the contrary, the present invention is intended to equivalent arrangements included with the spirit and scope of the claims. The following claims are to be accorded a broad interpretation, so as to encompass all such modifications and equivalent structures and functions.

What is claimed is:

1. A camera in which a magnetic head writes into and/or reads from a magnetic record carrier provided on a film, comprising:
    film-conveying means for conveying the film;
    restricting means for restricting a relative position between the magnetic head and the film edge and which is shiftable between a restricting position and a non-restricting position, wherein said restricting means, when in said restricting position, contacts the film edge during the conveying of the film so as to regulate the relative position between the magnetic head and the film edge and, when in said non-restricting position, is maintained out of contact with the film edge during the conveying of the film; and
    controlling means for maintaining said restricting means at the restricting position and prohibiting the shift to the non-restricting position during the operation of said magnetic head.

2. A camera according to claim 1, wherein said magnetic head operates at least when one frame of the film is being conveyed after an exposure thereof.

3. A camera according to claim 1, wherein said restricting means is provided on a film platen which is movable in the direction of a width of the film.

4. A camera according to claim 1, wherein said restricting means is carried by said magnetic head.

5. A camera in which a magnetic head writes into and/or reads from a magnetic record carrier provided on a film, comprising:
    film-conveying means for conveying the film;
    restricting means for restricting a relative position between the magnetic head and the film edge and which is shiftable between a restricting position and a non-restricting position, wherein said restricting means, when in said restricting position, contacts the film edge during the conveying of the film so as to regulate the relative position between the magnetic head and the film edge and, when in said non-restricting position, is maintained out of contact with the film edge during the conveying of the film; and
    controlling means for shifting said restricting means between the restricting and the non-restricting positions.

6. A camera according to claim 5, wherein said controlling means maintains said restricting means in said non-restricting position when said film is being conveyed in a first direction by said film-conveying means and maintains said restricting means in said restricting position when said film is being conveyed in a second direction by said film-conveying means.

7. A camera according to claim 6, wherein said camera continuously conveys said film in said first direction and conveys said film in said second direction in a frame-by-frame fashion after exposure of each frame.

8. A camera, comprising:
    a head unit which writes into and/or reads from a record carrier provided on a film, said head unit being shiftable between a recording position and a non-recording position;
    film-conveying means having a first mode and a second mode, said film-conveying means in its first mode conveying the film in a first direction and in its second mode in a second direction, which is opposite to the first direction; and
    controlling means being coupled with said film-conveying means, said controlling means maintaining said head unit in the non-recording position when said film-conveying means is in its first mode and the film is being conveyed in the first direction, and said controlling means maintaining said head unit in said recording position when said film-conveying means is in its second mode,
    wherein the operation for exposing one frame of the film and the operation for conveying one frame of the film are performed repeatedly when said film-conveying means is in its second mode.

9. A camera according to claim 6, wherein said head unit comprises a read/write head and a pressing element for pressing the film therebetween.

10. A camera according to claim 8, wherein at said recording position, said read/write head and said pressing element are positioned to contact said film, and at said non-recording position, either said read/write head or said pressing element or both are positioned to avoid contact with said film.

11. A camera according to claim 8, wherein said camera continuously conveys said film when said film-conveying means is in said first mode and conveys said film in a frame-by-frame fashion after each exposure of a frame when said film-conveying means is in said second mode.

12. A camera according to claim 9, wherein said read/write head is a magnetic head and said record carrier of the film is a magnetic record carrier.

13. A camera according to claim 12, wherein said magnetic head and said pressing element pressingly sandwich said magnetic record carrier therebetween to perform writing and/or reading at the recording position and release the film at the non-recording position.

14. A camera according to claim 8, further comprising a film-winding spool,
wherein in the first mode said film-conveying means conveys a film from a film cartridge to said film-winding spool, and in the second mode conveys the film one frame at a time from said film-winding spool to the film cartridge after each exposure.

15. A camera according to claim 8, further comprising a motor,
wherein said film-conveying means operates in the first mode by said motor driving in a first direction and operates in the second mode by said motor driving in a second direction, which is opposite to the first direction; and
wherein said controlling means shifts said head unit between the recording and the non-recording positions according to the driving direction of said motor.

* * * * *

UNITED STATES PATENT AND TRADEMARK OFFICE
CERTIFICATE OF CORRECTION

PATENT NO. : 5,353,078
DATED : October 4, 1994
INVENTOR(S) : Chikara Aoshima

It is certified that error appears in the above-indentified patent and that said Letters Patent is hereby corrected as shown below:

COLUMN 8:

Line 26, "the" (second occurrence) should be deleted.

COLUMN 13:

Line 35, "intended to" should read --intended to cover--.

COLUMN 14:

Line 53, "claim 6," should read --claim 8,--.
    Line 56, "claim 8," should read --claim 9,--.

Signed and Sealed this

Twenty-first Day of March, 1995

Attest:

BRUCE LEHMAN

*Attesting Officer*      *Commissioner of Patents and Trademarks*